US005499548A

United States Patent [19]

Keller

[11] Patent Number: 5,499,548

[45] Date of Patent: Mar. 19, 1996

[54] MANUALLY OPERATED ACTUATING DEVICE

[76] Inventor: Wilhelm A. Keller, Obstgartenweg 9, CH-6402 Merlischachen, Switzerland

[21] Appl. No.: 216,977

[22] Filed: Mar. 24, 1994

[30] Foreign Application Priority Data

Apr. 20, 1993 [CH] Switzerland .......................... 01195/93

[51] Int. Cl.[6] .............................. B67D 5/42; G01F 11/18

[52] U.S. Cl. .................................. 74/96; 74/160; 74/523; 222/391

[58] Field of Search ............................ 74/96, 105, 141.5, 74/156, 160, 104, 491, 523; 222/391

[56] References Cited

U.S. PATENT DOCUMENTS 2,726,802 12/1955 Jones .................................. 222/391 X
2,732,102 1/1956 Ekins .................................. 222/391 X
2,978,242 4/1961 Arlauskas .............................. 74/105 X
4,289,257 9/1981 Herb et al. .......................... 222/391 X
4,660,743 4/1987 Speisebecher et al. ............... 74/160 X
5,052,243 10/1991 Tepic .................................. 222/391 X

FOREIGN PATENT DOCUMENTS

WO8901322 2/1989 WIPO .

*Primary Examiner*—Rodney H. Bonck
*Attorney, Agent, or Firm*—Marks & Murase

[57] ABSTRACT

The movable actuating lever is connected to a transmission lever, at one hand, and is guided by means of a pin within a guideway in the housing of the apparatus, on the other hand. The transmission lever serves at the same time for transmitting the actuating motion via further levers to the apparatus part to be actuated. Due to the position and the shape of the guiding groove and the lever, the course of motion of the actuating lever with respect to the fixed handle portion may be optimally adapted to technical and ergonomic requirements in order to achieve an effective force transmission having minimal frictional losses. Furthermore, no levers are in the way, and injuries are avoided.

10 Claims, 4 Drawing Sheets

MANUALLY OPERATED ACTUATING DEVICE

The present invention refers to a manually operated actuating device for operating at least one movable part of an apparatus by hand, in particular a trust member for the delivery of a flowable medium, having an actuating lever connected to said movable part via a lever system.

BACKGROUND OF THE INVENTION

Such an actuating device is known from the PCT Publication No. WO 89/01322. The actuating device disclosed in that document is designed as a four-point or four-lever articulation, two levers of the device being linked to the end of the actuating lever which is distant from the apparatus housing. The transmission of the motion to the said apparatus part to be actuated, for example a ram, is effected via a steering lever which necessitates a correspondingly strong execution of this lever. The purpose of that construction is essentially to have the strongest fingers of the actuating hand applied at the free end of the actuating lever which faces the apparatus housing in order to exert an increased force. That construction is heavy, and there is an increased risk of soiling, on one hand, and the risk of catching a finger, the ball of the thumb or a glove during actuating between the widely protruding levers, on the other hand. Furthermore, the protruding of the lever system leads to the effect that the upper fingers exert a torque and traction and pressure forces on several axles which causes an increased friction.

SUMMARY OF THE INVENTION

Starting from this prior art, it is an object of the present invention to provide an actuating device having an actuating lever which permits a more lightweight, more compact and thus better protected construction wherein the actuating lever is optimally guided and has a minimal friction. This object is met by the device defined in the independent claims. The dependent claims describe preferred embodiments of the invention.

BRIEF DESCRIPTION OF THE DRAWINGS

The invention will now be explained in more detail with reference to embodiments thereof which are represented in the drawing.

DETAILED DESCRIPTION OF THE INVENTION

Figure 1:
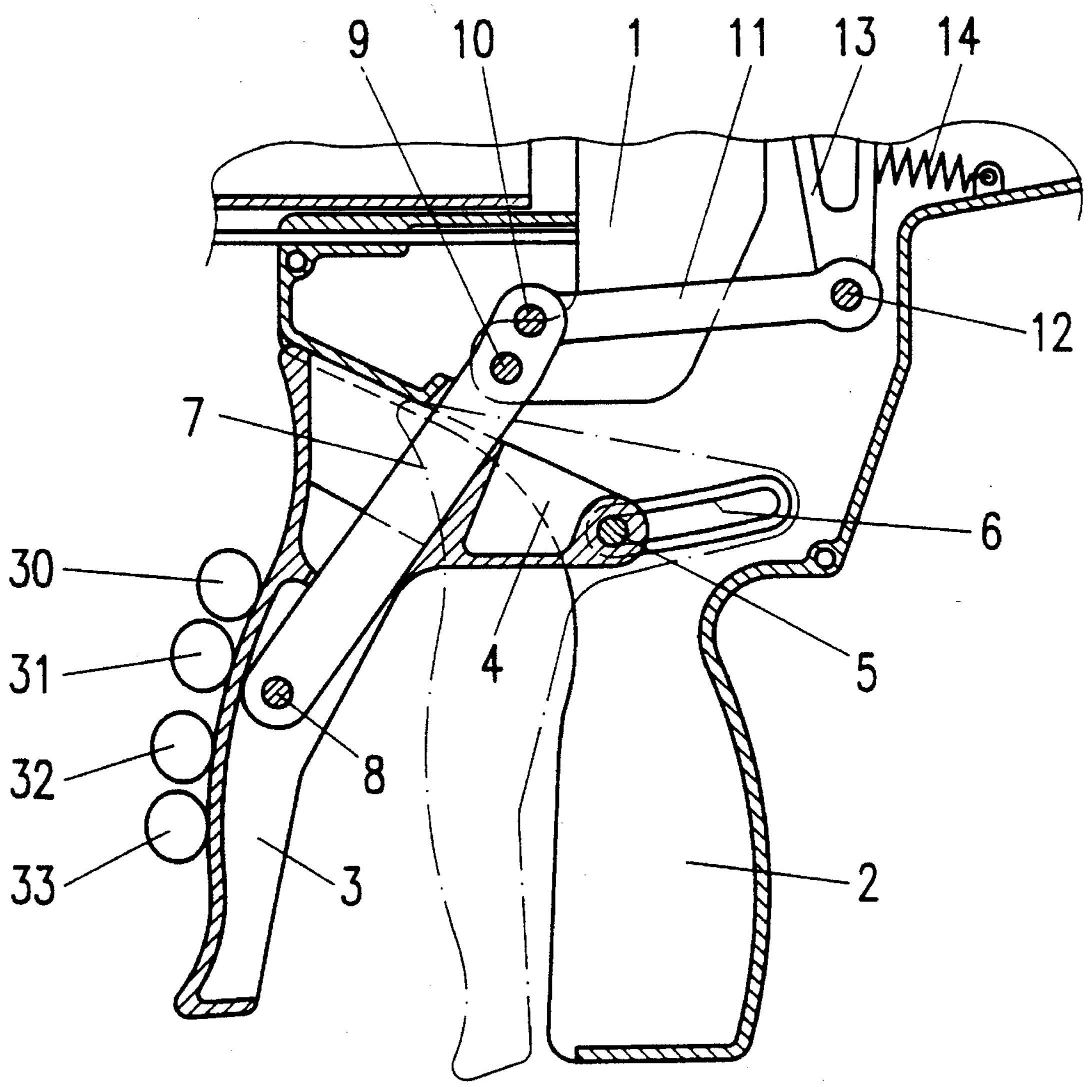
FIGS. 1 and 2 each show a first embodiment of this invention having a guideway for the actuating lever, and FIGS. 3 and 4 each show a second embodiment of an actuating device according to this invention.

FIG. 1 shows the lower portion of an apparatus housing 1 having a fixed handle part 2. The actuating lever 3 has an eye 4 bearing a guide pin 5 which protrudes with both of its sides into respective guiding grooves 6 which may be curved but may also be rectilinear as shown. Instead of a guiding pin 5, a guiding roller or a ball-bearing may be used. A transmission lever 7 is articulated to the actuating lever 3 by means of a pin 8. The transmission lever 7 may swivel about a fixed pin 9 and is articulated for a swiveling movement to a connection joint bar 11 by a pin 10. The joint bar 11 is articulated by a pin 12 to a further lever 13 which acts upon the apparatus part to be actuated, for example a thrust member for delivering a flowable medium such as one-component or two-component adhesive cements, etc. A recovery spring 14 acts on the lever 13 and holds the articulated lever system in the home position represented in full lines.

For operating the device, the handle parts 2 and 3 are seized in the usual way in order to pull the actuating lever 3 against the fixed handle part 2. The motion of the actuating lever 3 is determined by the pin 5, sliding within the guiding grooves 6, and by the swiveling motion of the transmission lever 7. FIG. 1 indicates in dashed lines the approximate end position of the actuating lever 3. It can be seen that the entire lever makes a definitely guided and determined movement having a strongly translatory component of the entire lever and a relatively weak swiveling motion. This results in achieving not only a long path of the lever but also an ergonomically optimal movement. By the shaping of the guiding grooves and their position relative to the swiveling axes 8 and 9, the course of motion may be optimally selected.

The lower swiveling pin 8 of the actuating lever 3 is located about at the center of the four application points 30 to 33 of the four fingers. The torques exerted on the guiding pin 5 are thus mutually cancelled to a large degree, and there is no friction or only a very modest one at this point, thus resulting in a more effective transmission of forces.

As it may further be seen in FIG. 1, there are no movable parts essentially protruding out of the housing, the actuating lever excepted, which guarantees not only a lightweight construction without considerable material costs but also improved safety and cleanliness, the absence of a number of mutually movable parts protruding from the housing further avoiding a catching of fingers, thumb balls or gloves.

Figure 2:
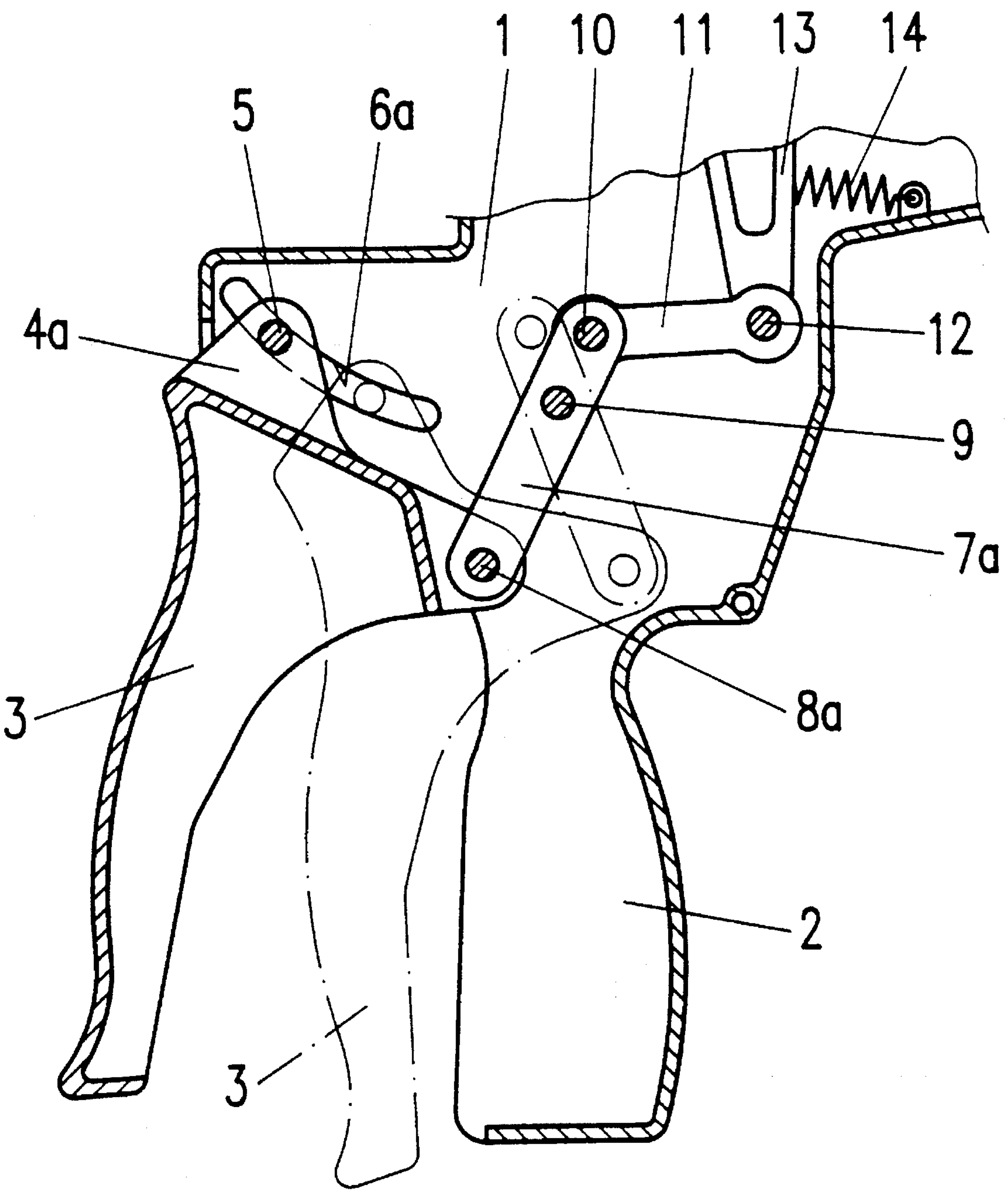

FIG. 2 shows an embodiment which is similarly constructed to that of FIG. 1. Corresponding parts have the same reference numerals as in FIG. 1, and their function will be described only in part. An essential difference of the embodiment of FIG. 2 with respect of that of FIG. 1 is the fact that the guiding groove *6a* is not located, seen in the actuating direction of the actuating lever 3, behind but in front of the transmission lever *7a*. Another difference lies in that the transmission lever *7a* is shorter than the lever 7. The joint bar 11 and the lever 13 are about the same as in FIG. 1 and have the same functions.

The eye *4a* of the actuating lever 3 bearing the guiding pin 5 is slightly differently shaped than the eye 4 in FIG. 1 but has also the same function, an in the embodiment of FIG. 2 too, the lever *7a* and the guiding grooves *6a* determine definitely the motion of the actuating lever 3 with the advantageous effects outlined above.

As it has already been mentioned, it is possible, especially by the shape and position of the guiding grooves 6 and *6a*, respectively, to influence substantially in any desired way the course of motion of the actuating lever 3 and to adapt it to all sorts of conditions. When a particular construction is determined, the costs of manufacture are not particularly influenced in contrast to the known construction described above which presents furthermore narrow geometric limits.

Figure 3:
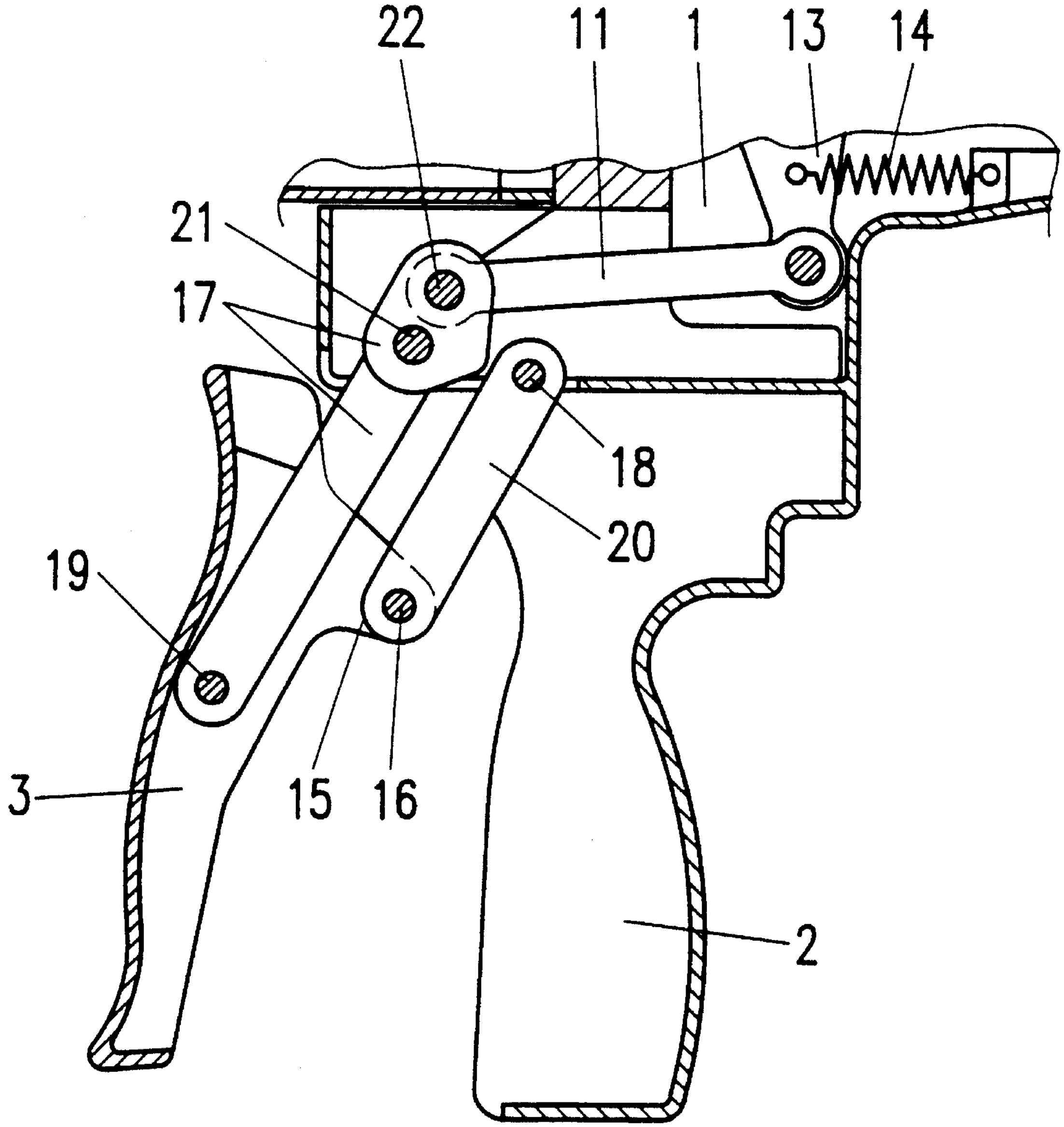

FIG. 3 shows a further embodiment. Here again, corresponding parts bear the same reference numerals as in FIGS. 1 and 2, and these parts are no longer separately described. The transmission lever 17 is articulated, as in the embodiments of FIGS. 2 and 4, at its lower end about near the center of the four fingers at the actuating lever 3 by an axle 19, and its upper end is lodged for a swiveling motion about the axle 21 within the apparatus housing. The joint bar 11 is connected via a second rotational axle 22 above the axle 21 to the transmission lever 17, and the other end is connected to the lever 13.

In this embodiment, an eye 15 of the actuating lever 3 is connected by means of a pin 16 for swiveling motion to a guide lever 20 whose other end is articulated to the apparatus housing by means of a pin 18. The actuating lever 3 is represented in FIG. 3 in its home position determined by the recovery spring 14. For operating the apparatus, e.g. for pressing a composition out of one or more cylinders or cartridges, the actuating lever 3 is pulled against the fixed handle part 2. In positioning the lower fulcrum at about the center of the four fingers, there are substantially no torques, and the forces exerted on the bearings are low. It should further be noted that there are no levers in the handling region thus avoiding any risk of injury and strongly diminishing the risk of soiling.

Figure 4:
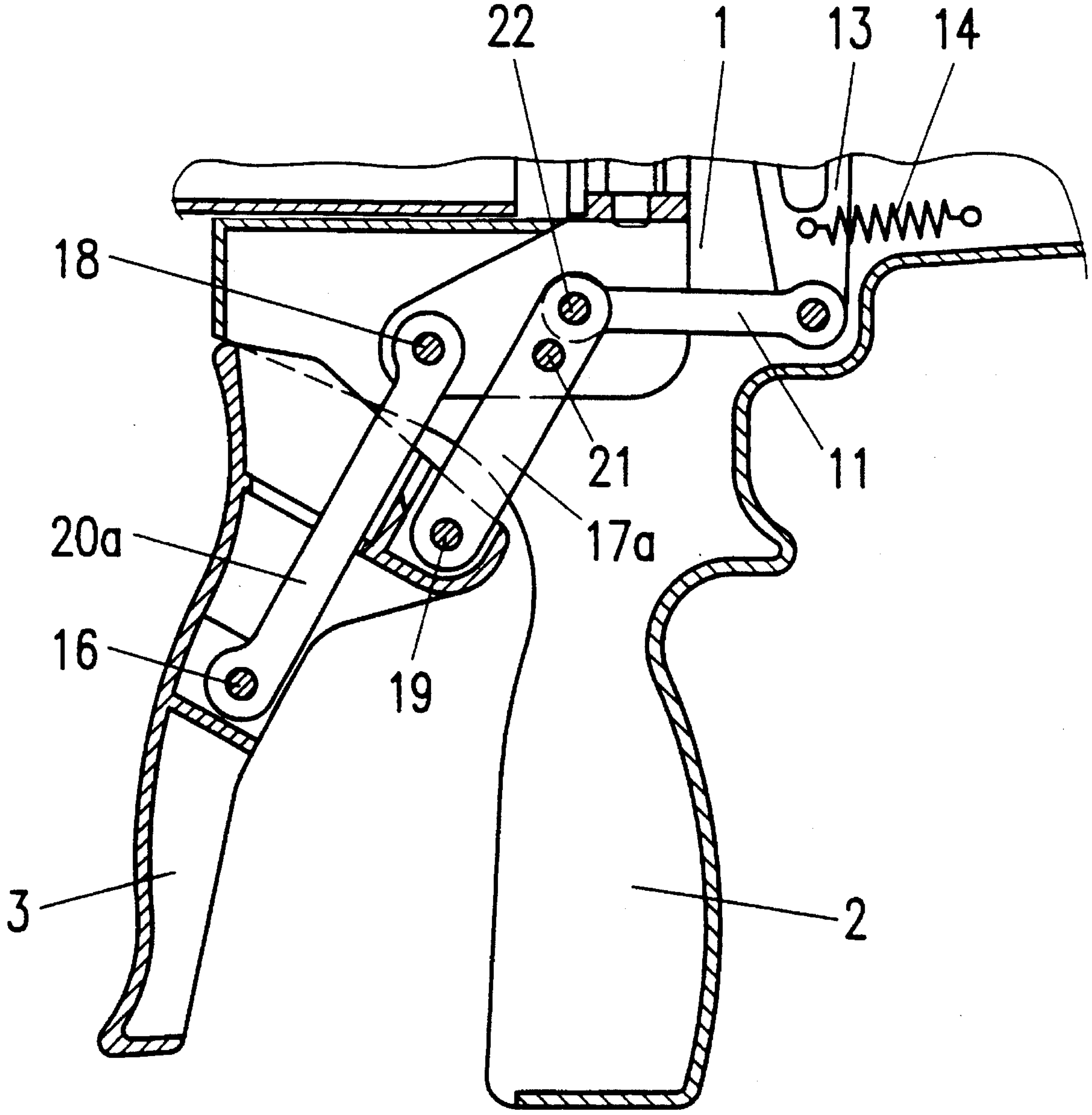

FIG. 4 shows an embodiment which principally corresponds to that of FIG. 3, and corresponding parts bear the same reference numerals as those of FIG. 3. The position of the transmission lever and the guiding lever are exchanged, that is, the transmission lever 17*a* is situated nearer to the fixed handle part 2 than the guide lever 20*a*. For the rest, the embodiment of FIG. 4 distinguishes in that the levers 17*a* and 20*a*, particularly the longer lever 20*a* too, are lodged within the closed cavity of the actuating lever 3 or within the laterally closed space of the apparatus housing. In this embodiment too, there are no freely accessible levers between the actuating lever and the fixed handle part, and there is thus no risk of injuring the operator or the catching of objects, and no risk of soiling. In this embodiment too, one of the two levers extends as in the embodiment of FIG. 3 at most to the center of the actuating lever, and this embodiment also represents a considerably less expensive and heavy construction compared with the known device.

I claim:

1. An actuating device on an apparatus for manually operating at least one movable part of said apparatus comprising:

an actuating lever with four gripping points corresponding to four fingers of a hand that actuates the device;

a lever system connecting said actuating lever and said movable part; and a guideway for guiding a motion path of said actuating lever;

wherein said lever system comprises a transmission lever pivotally connected to said actuating lever at a swiveling axis; and wherein said movable part is a thrust member for the delivery of a flowable medium.

2. An actuating device as in claim 1, wherein the swiveling axis is located about at the center between the four gripping points in order to lower a torque acting upon the guideway.

3. An actuating device as in claim 1, wherein the guideway is curved or rectilinear according to the desired motion.

4. The actuating device of claim 3, wherein the guideway is situated, seen in actuating direction of the actuating lever, in front of or behind said swiveling axis.

5. The actuating device of claim 4, wherein the actuating lever comprises an eye at an end situated opposite to said gripping points and facing said apparatus, the actuating lever being guided at this eye by means of a guiding pin in said guideway which is located in front of said swiveling axis, the transmission lever being linked at the other end of the actuating lever facing the apparatus.

6. The actuating device of claim 4, wherein the actuating lever comprises an eye situated at an end near to said gripping points and facing said apparatus, the actuating lever being guided at this eye by means of a guiding pin in said guideway which is located behind said swiveling axis.

7. An actuating device on an apparatus for manually operating at least one movable part of said apparatus comprising:

an actuating lever with four gripping points corresponding to four fingers of a hand that actuates the device;

a lever system connected to said actuating lever comprising two swivelling levers which hinge and guide said actuating lever;

wherein one of said two swivelling levers is a transmission lever for connecting said actuating lever to said movable part;

wherein a second swivelling lever is a guiding lever connected between the actuating lever and a housing of said apparatus;

wherein at least one of said transmission lever and guiding lever is connected to the actuation lever at a position located within an upper half of said actuation lever facing said apparatus; and wherein said movable part is a thrust member for the delivery of a flowable medium.

8. An actuating device as in claim 7, wherein said transmission lever is pivotally connected to said actuating lever at a swiveling axis located about at the center between the four gripping points in order to lower any torque or pressure forces generated at lever axis connections.

9. The actuating device of claim 7, wherein said guiding lever is disposed in front of or behind said transmission lever.

10. An actuating device as in claim 7, wherein said actuating lever and said apparatus comprise first and second hollow interiors, respectively; and wherein said lever system is enclosed within these hollow interiors.

* * * * *